ENDLESS, FOLDED MAGNETORESISTIVE HEAD

This is a divisional of co-pending application Ser. No. 06/457,830, filed on Jan. 14, 1983, now U.S. Pat. No. 4,535,375.

BACKGROUND

The present invention relates to magnetoresistive heads, examples of which are shown in U.S. Pat. Nos. 4,040,113; 4,141,051; 4,052,748; 3,848,217; 4,142,218; 3,979,775, 4.103,315; 4,315,291; 3,493,694; 3,405,355; 4,321,640; and 3,860,965.

Magnetoresistive heads include a strip-shaped element of a ferromagnetic, metallic, magnetically anisotropic material, for example NiFe, commercially known as Permalloy, which is deposited in a thin film on a substrate and positioned either with one of its edges in the immediate proximity of a magnetic recording medium, or alternatively, the element is positioned remotely from the medium with a flux guide arranged to bring the magnetic fields of the medium to the element. The fields of the recording medium produce variations in the magnetization of the element and thereby modulate the resistance of the element via the magnetoresistive effect. In order to measure the changing resistance of the magnetoresistive element, the element is electrically biased. This is typically done by directing an electric current through the element. Detection circuitry is then connected to the element so that the changing resistance of the element can be monitored to produce an output which is representative of the information stored on the medium.

A problem associated with prior art magnetoresistive heads has been the presence of Barkhausen noise in the output of the heads caused by the erratic movement of magnetic domain walls in the magnetoresistive element in response to the magnetic fields of the medium.

Another problem has been to ensure that the magnetic field generated by the bias current in the magnetoresistive element does not become so great as to alter the magnetically recorded data on the medium.

SUMMARY

The magnetoresistive head of the present invention is, therefore, designed to eliminate Barkhausen noise by producing single domain magnetization in the read portion, or active region, of the magnetoresistive element. In addition, the element is designed to require only a minimal bias current to produce single domain magnetization in the active region of the element.

The invention achieves this object by employing an elongated magnetoresistive element wherein only the central region of the element is utilized for reading the data. By moving the ends of the magnetoresistive element far away from the central "active region" of the element, the demagnetizing effects of the magnetic fields at the ends of the element on the central region of the element are minimized, and a minimal amount of current is, therefore, required to achieve a single domain magnetic orientation in the central active region. By producing a single domain active region, Barkhausen noise caused by the movement of domain walls is eliminated since the domain walls are themselves eliminated in the active region. In this "hammer head" embodiment, the changing resistance of the element is sensed only across the active region rather than across the entire element. Equipotential strips are disposed on opposite ends of the active region and directly connected to the detection circuitry to facilitate this selective reading of the element.

In a second embodiment, the ends of the elongated magnetoresistive element are, in effect, joined in that the magnetoresistive element is folded into an endless vertically oriented frame. In this "picture frame" embodiment, the magnetoresistive frame element has two horizontal legs and two vertical legs, with only one of the horizontal legs of the frame being used to read data. The demagnetizing forces produced by the ends of the element are eliminated since the ends themselves have been eliminated, and only a minimal amount of bias current is, therefore, required to achieve single domain magnetization in the four magnetoresistive elements of the frame.

It is, therefore, an object of the present invention to provide an improved magnetoresistive read head.

It is another object to provide a magnetoresistive read head wherein the magnetic flux path of the element is substantially longer than the central active region of the element employed for reading data from the medium.

Another object is to provide an elongated magnetoresistive read head wherein a minimal current is required to achieve a single domain orientation in the central active region of the element used for reading data.

Still another object is to provide a magnetoresistive read element wherein the changing resistance of the central active region of the element is measured between equipotential strips disposed on opposite ends of the active region.

Yet another object is to effectively provide a very long magnetoresistive read element in order to minimize the effect of the demagnetization forces produced by the ends of the element.

Still another object is to effectively provide a very long magnetoresistive read element by folding the element and joining its ends.

These and other objects, advantages and novel features of the invention will become apparent from the following detail description of the invention taken in conjunction with the accompanying drawings.

BRIEF DESCRIPTION OF THE FIGURES

FIG. 1A shows the hammerhead embodiment of the present invention.

FIG. 1B shows a portion of the FIG. 1A embodiment.

FIG. 1C shows an unmagnetized magnetoresistive strip.

FIG. 1D shows a magnetoresistive strip under the influence of an external magnetic bias.

FIG. 2 shows the picture frame embodiment of the present invention.

DESCRIPTION OF THE PREFERRED EMBODIMENT

Figure 4:
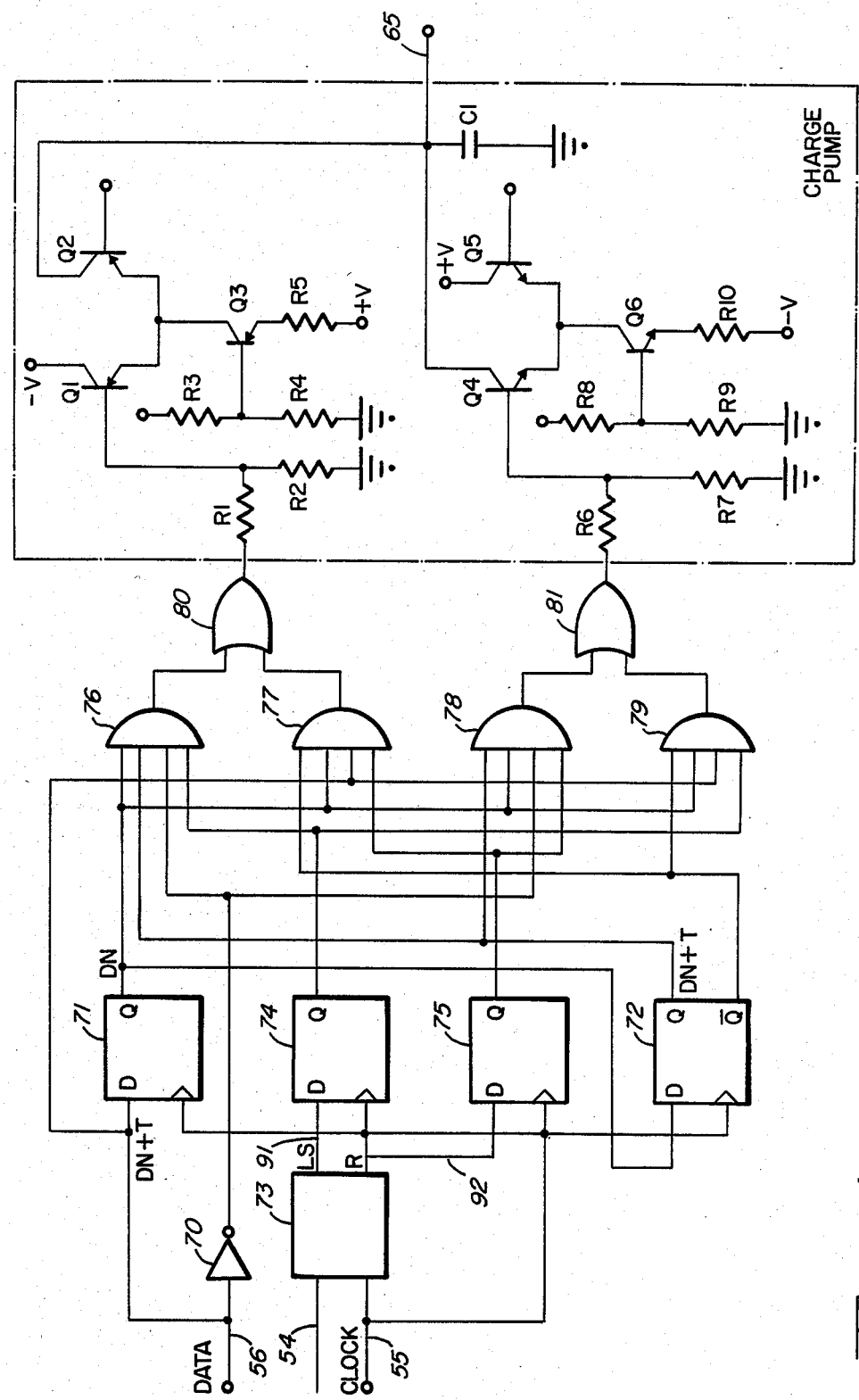

The basic principal of the present invention is most easily described with reference to FIGS. 1A through 1D.

FIG. 1A shows an elongated magnetoresistive element 1 such as would be deposited on a substrate (not shown) and incorporated into a magnetic head (not shown) to read a selected track 5 of the magnetic recording medium 10. Element 1 has a distant first end 15, and a distant second end 17, and a central region 19 intermediate the distant ends 15, 17. Equipotential strips

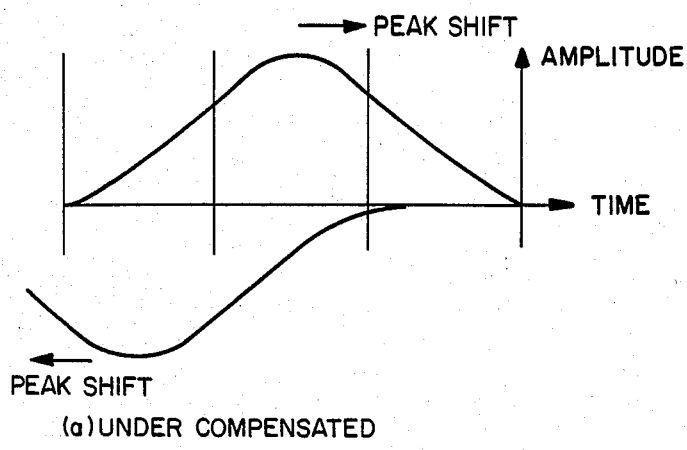
(a) UNDER COMPENSATED
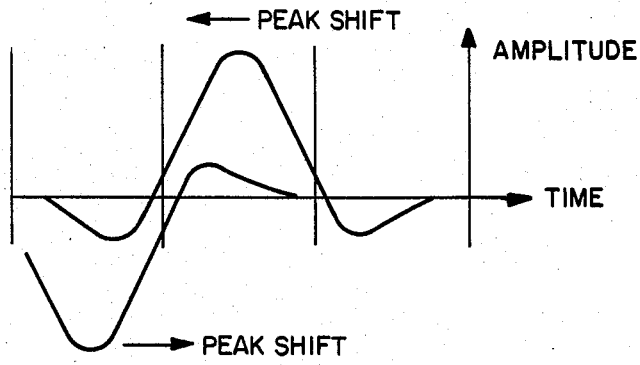
(b) OVER COMPENSATED
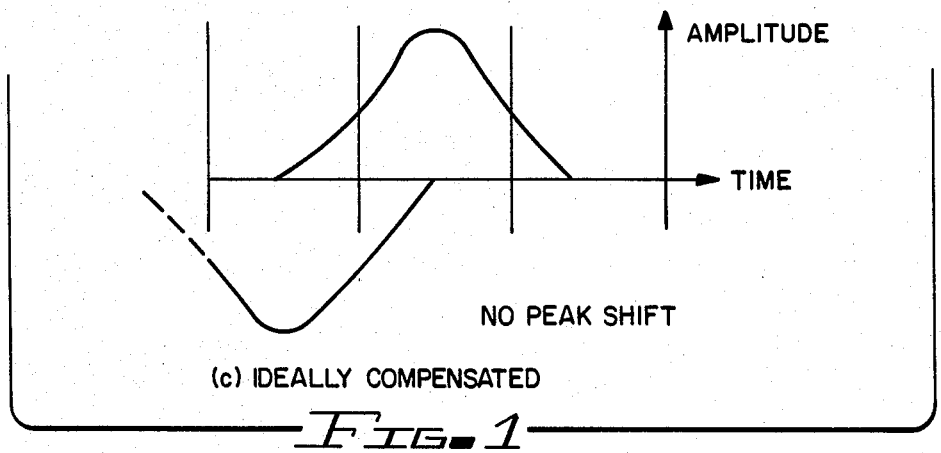
(c) IDEALLY COMPENSATED
FIG. 1

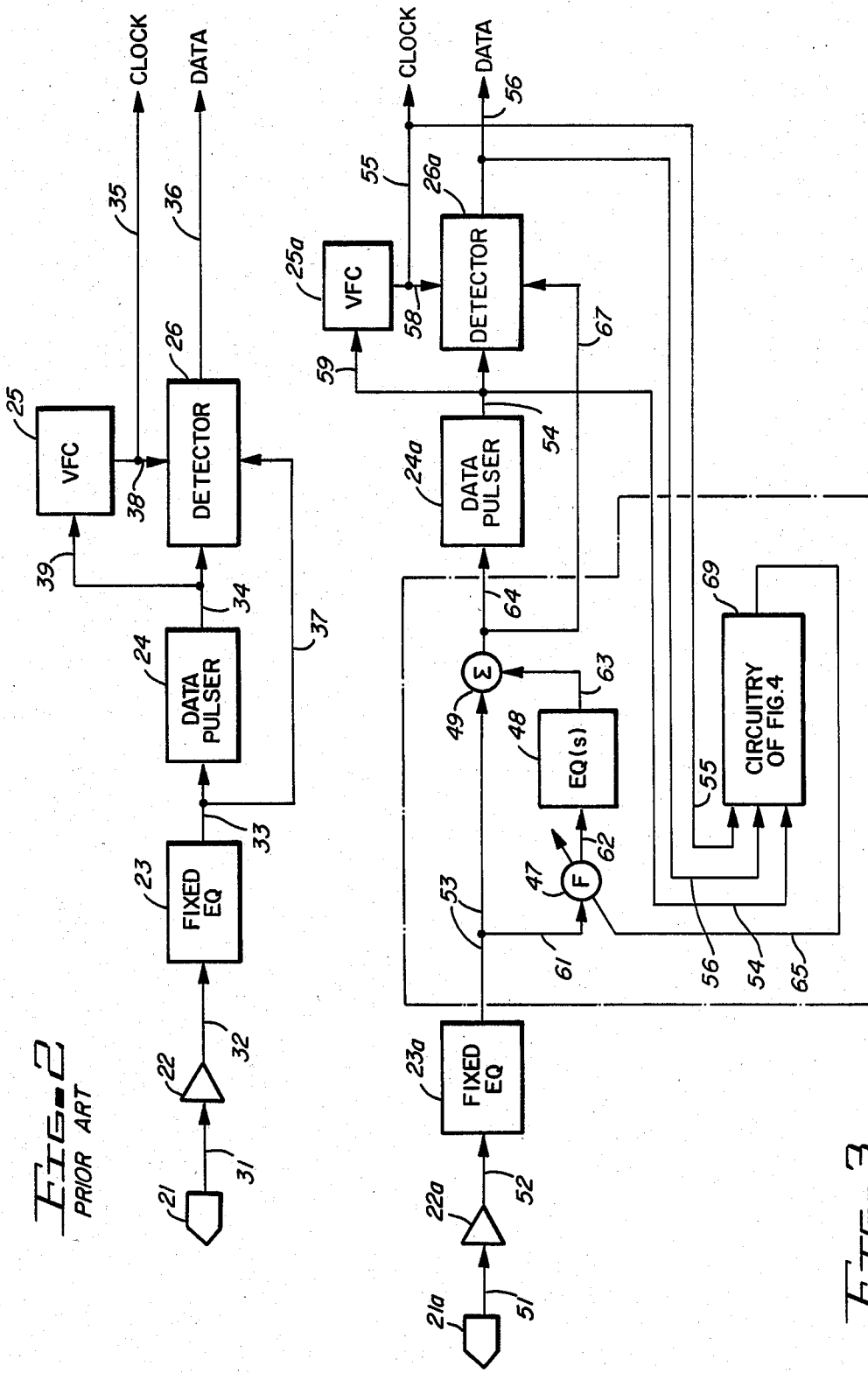

ADAPTIVE EQUALIZATION CIRCUIT FOR MAGNETIC RECORDING CHANNELS UTILIZING SIGNAL TIMING

BACKGROUND OF THE INVENTION

The invention relates to adaptive equalization in magnetic recording channels. More particularly the invention concerns an active equalization circuit which utilizes signal timing of random signal data rather than amplitude to obtain a measure of the needed equalization signal.

DISCUSSION OF THE PRIOR ART

The need for equalization or pulse shaping in magnetic recording channels is well recognized as being necessary to compensate for signal distortions that occur due to different head characteristics in different machines.

In the past signal equalization was provided by a fixed equalization circuit in the channel. However, at higher recording densities now in use, a single equalization setting is not likely to adequately compensate the signal across the total variation that may occur due to head, media and machine factors.

Other more advanced equalization techniques have been designed including automatic equalization loops wherein a training sequence of known pulses is provided, whereby the loop can measure the amplitude of the known pulses and determine an error signal that is used to control the amount of the equalization feedback signal necessary to compensate the recording signal. One example of such systems utilizes a so-called two frequency approach wherein the amplitude is measured at two different frequencies and the gain of the compensation circuit is stabilized by setting the gain at the ratio of the two frequencies to unity. This compensation technique results in ideal compensation at the two frequencies. However, it has been recognized that distortion occurs at other than the two frequencies sampled, and that the compensation applied may tend to leave the total pulse envelope in an over compensated or under compensated state.

Another disadvantage of this type of equalization is that it involves a training sequence and is therefore not adaptive since it cannot be used to vary random pulses of a continuing data signal. Also, since a training sequence is used, such systems are limited to periodic compensation and not continuous compensation.

Accordingly, a need exists in the art for a continuous equalization technique which can be utilized to derive an error signal from random data of a magnetic recording signal.

SUMMARY OF THE INVENTION

An object of the invention is to provide an adaptive equalization circuit which utilizes a measurement of signal timing to determine the amount of equalization applied on a continuous basis.

This object and other features of the invention are attained in an equalization circuit which utilizes a feedback compensation path. In the circuit the relative timing of random data pulses is sensed as an indication of error, the relative timing signal is provided to a logic circuit and the logic circuit output controls an equalizer amplifier to provide a variable factor of compensation in accordance with whether the pulse timing is in an over compensated or an under compensated state. The equalization is adaptive in the sense that compensation is continuously carried out with respect to the data pulses, and in the sense that random bursts of data pulses are evaluated rather than a training sequence of known pulse format.

BRIEF DESCRIPTION OF THE DRAWINGS

The above features and advantages of the invention are described in a detailed description included hereinafter, taken in conjunction with the drawings wherein FIGS. 1(a) and 1(b) represent typical graphs of under compensation and over compensation with respect to peak shift pulses, and FIG. 1(c) represents a graph of ideal compensation.

FIG. 2 is a block diagram of the reproduction circuitry of a digital magnetic recording channel.

FIG. 3 is a block diagram where the reproduction circuitry of FIG. 2 has been enhanced according to the teaching of this invention.

FIG. 4 is a circuit embodiment used to generate gain control signals in accordance with the invention.

DETAILED DESCRIPTION OF THE INVENTION

Referring now to the drawings, a preferred embodiment of the invention is described comprising an active symmetrical equalization circuit for magnetic recording channels capable of handling high density signals. It should be recognized that the term adaptive equalization is intended to mean compensation of random data without prior knowledge of what the data is, as opposed to other techniques which use "training sequences" or pulses of known data content to vary the amount of equalization.

FIG. 2 illustrates a block diagram of the reproduction circuitry of a digital magnetic recording channel. Read signals are picked up from the magnetic media (tape or disk) by reproduce head 21. These signals are amplified by amplifier 22 and then shaped by fixed equalizer 23. Data pulser 24 outputs a logic pulse at the time of a positive or negative peak in the signal on conductor 33. Block 25 is a variable frequency clock that phase and frequency locks to the logic pulse outputs of data pulser 24. Detector block 26 detects whether the incoming data is a one or zero using inputs from clock 25, fixed equalizer 23 and data pulser 24. The above is all well known and understood in the prior art.

Fixed equalizer 23 is designed to equalize (shape) signals from nominal reproduce heads, media and machines. In high density magnetic recording, these components can vary considerably from their ideal values. This results in under-compensated and/or over-compensated signals such as those shown in FIGS. 1(a) and 1(b). It is the purpose of this invention to measure the resulting signal distortion by measuring the variation in signal peak timing and comparing it with the detected data. This comparison is used to generate a correction signal which will increase or decrease the amount of compensation until a signal substantially like that of FIG. 1(c) is achieved. When this signal shape is achieved, the signal peak timing will also be substantially the nominal desired value.

Accordingly, the reproduce circuitry is enhanced by the addition of circuitry to measure the signal distortion and a variable equalizer to adjust signal shapes. This arrangement is shown in FIG. 3. Blocks 21a, 22a, 23a, 24a, 25a and 26a of FIG. 3 perform substantially the same function as do blocks 21, 22, 23, 24, 25 and 26 of FIG. 2, respectively. In FIG. 3, blocks 47, 48, 49 and 69 have been added, in accordance with the invention. Block 48 is an equalizer filter designed to provide necessary additional compensation. A possible transfer function for block 48 is:

$$\frac{S^2}{S^2 + \frac{W_o}{Q} S + W_o^2}$$

This is the general equation of a high pass filter designed to accentuate high frequencies since high frequency loss is a common magnetic recording problem. It should be understood that other filters may be used in this block. Block 47 is a variable gain amplifier that varies the amount of signal output to equalizer filter 48. The gain of block 47 is varied in response to the control voltage on conductor 65. The value of the control voltage is determined by the measurements of signal peak timing error which is determined by block 69.

The detailed hardware of block 69 is shown in FIG. 4. It is the purpose of this circuitry to determine the amount of additional equalization required to properly equalize (shape) the read signals so that they will be substantially like the signals of FIG. 1(c). From the wave forms of FIG. 1, it can be seen that under-compensated pulses shift away from the closest neighboring pulses, whereas over-compensated pulses shift toward the closest neighboring pulses. For the case of ideal compensation, there is substantially zero peak shift.

Based upon this recognition, the logic in Table 1 has been generated for (d, k) run length code, where d is the minimum number of zeroes in the code and k is the maximum number. In the table T is equal to d+1:

TABLE 1

| SHIFT OF ONE AT TIME (N) | VALUE OF BIT AT (N−T) | VALUE OF BIT AT (N+T) | COMPENSATION |
|---|---|---|---|
| LEFT | 1 | 0 | OVER |
| RIGHT | 1 | 0 | UNDER |
| RIGHT | 0 | 1 | OVER |
| LEFT | 0 | 1 | UNDER |

In the discussion that follows, $D_N$ is defined as the value of the bit detected at time N; $D_{N+T}$ is defined as the value of the bit at time N+T for any arbitrary time j or k.

In accordance with the logic of Table 1, a correction will be made at time N only if $D_N$ is equal to 1, where $D_N$ has possible values of (1, 0).

The logic of Table 1 is based on an assumption that the interference in the read pulse is reasonably symmetrical and that the read pulse is of reasonably narrow configuration. This is essentially the function of fixed read equalizer 23. Equalizer 23 is designed such that the widest pulse at its output will not be more than two code bits wider than the ideally compensated pulse. In general for an arbitrary (d, k) code the pulse width should be less than (4+2d) code bits wide. Thus, for the graphs of FIG. 1 where d=0, the pulse at the output of fixed equalizer 23 should be less than 4 code bits wide.

The logic of Table 1 can be implemented with the detailed hardware illustrated in FIG. 4. Referring to FIG. 4, block 73 is a clock correction circuit that determines if the logic data pulse on conductor 68 occurs to the left (prior in time) of the center of the clock period or to the right (later in time) of the center of the clock period. The clock wave form is on conductor 55. This circuit function is well known in the prior art and is used in phase-lock loop designs.

If the logic data pulse on conductor 54 is left shifted, a positive level is output on conductor 91. If the logic data pulse is right shifted, a positive logic level is output on conductor 92. Data is input on conductor 56 and goes to flip-flop 71. Flip-flops 71, 72, 74 and 75 are logic delays and are used to properly time align the input signals to AND gates 76, 77, 78 and 79, respectively.

The reader will understand that the arrangement of FIG. 4 is for a (d, k) code where d=0. In general for an arbitrary d, k code, each flip-flop block is replaced by d+1 flip-flops. Thus, for the case shown for d=0, each flip-flop becomes 0+1 or one flip-flop. For a code with d=1, each flip-flop would be replaced by 1+1 or two flip-flops. In all other respects, the circuitry of FIG. 4 would remain the same for all other (d, k) codes.

AND gates 76, 77, 78, 79 and OR gates 80, 81 implement the logic of Table 1. The output of gate 80 is high if overcompensation is measured. The output of gate 81 is high if under-compensation is measured. The circuitry including transistors Q1, Q2, Q3, Q4, Q5, Q6 and resistors R1, R2, R3, R4, R5, R6, R7, R8, R9, R10 form a charge pump. The electric charge (voltage) on capacitor C1 is increased if the output of gate 80 is high representing an over-compensation condition. The voltage on capacitor C1 is decreased if the output of gate 81 is high representing an under-compensation condition. The voltage on capacitor C1 appears on conductor 65. As seen in FIG. 3, this is used as the control voltage for variable gain amplifier 47. The gain of amplifier 47 is thus increased or decreased to correct the measured over or under compensation condition.

The equalization circuit described hereinbefore is believed to be significantly different from the prior art in that it is truly adaptive, with the term adaptive being used in the sense that it can adapt even in random data without prior knowledge of what that data is. This enables the system to equalize the signals being read from tape or disk defected areas that might otherwise affect data reliability. The technique of changing the equalizer in response to an error signal that relates to the relative timing of present and past detected data values is advantageous and permits the circuit to be used in a continuously adaptive mode in random data. The use of signal timing to effect changes in the equalizer response makes this invention insensitive to signal amplitude loss that occurs in media defects. Thus, the equalized signal is continuously compared with the data to determine whether the amount of equalization is correct.

What is claimed is:

1. An equalization circuit for a magnetic recording data channel which utilizes a feedback compensation path to provide a correction signal to one input of a summation amplifier, which functions as an element of a variable equalizer, wherein the amplifier receives a magnetic recording signal as its other input and provides a compensation signal as the output of the summation amplifier;
    timing sensing means for sensing the relative timing of random data pulses of the data channel and providing an output signal as an indication of error,
    logic circuit means receiving the timing sensing means output signal and providing an output in response thereto for interpreting whether the timing is equivalent to an over compensated or an under compensated state, and circuit means providing the output of the logic circuit means as the correction signal input to vary the compensation signal provided by the summation amplifier in the feedback compensation path of the equalization circuit.

2. The equalization circuit of claim 1 wherein the feedback compensation path operates continually on random date pulses of the magnetic recording signal.

3. The equalization circuit of claim 2 further including a fixed equalizer in the data channel.

4. The equalization circuit of claim 3 wherein the timing sensing means comprises means for detecting three relative levels of timing.

5. The circuit of claim 4 wherein the means provided to receive the output of the logic circuit means includes charge pump.

6. An adaptive equalization circuit for a magnetic recording channel comprising:

recording channel sensing and amplification means, means for sensing and determining data 1's and data 0's on the channel, time detection means for continuously monitoring the relative timing of random data pulses on the channel and producing timing signals therefor, logic means receiving the timing signals for determining the instantaneous compensation state of the data pulses for which timing is sensed, signal means receiving the output of the logic means for providing a control signal, and variable equalizer means for continuously varying the equalization of the channel in response to the output of the signal means.

7. The circuit of claim 6 where the equalization means comprises a variable amplifier.

8. The circuit of claim 7 wherein the signal means comprises charge pump means for receiving the output of the logic means.

9. The circuit of claim 7 wherein the adaptive equalization circuit further includes a fixed equalizer in the recording channel path.

10. The circuit of claim 8 wherein the logic means is responsive to left shift and right shift of instantaneous data position.

* * * * *